United States Patent
Gao

(10) Patent No.: US 10,268,860 B2
(45) Date of Patent: Apr. 23, 2019

(54) WHITE ILLUMINATION FOR BARCODE SCANNERS WITH IMPROVED POWER EFFICIENCY AND COST

(71) Applicant: Datalogic ADC, Inc., Eugene, OR (US)

(72) Inventor: WenLiang Gao, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 0 days.

(21) Appl. No.: 15/389,090

(22) Filed: Dec. 22, 2016

(65) Prior Publication Data

US 2018/0181786 A1 Jun. 28, 2018

(51) Int. Cl.
*G06K 7/14* (2006.01)
*G06K 7/10* (2006.01)
*G06K 19/06* (2006.01)

(52) U.S. Cl.
CPC ....... *G06K 7/1478* (2013.01); *G06K 7/10732* (2013.01); *G06K 7/10742* (2013.01); *G06K 7/1413* (2013.01); *G06K 19/0614* (2013.01); *G06K 19/06028* (2013.01)

(58) Field of Classification Search
CPC ............................. G06K 7/10732; G06K 7/14
USPC ................................................... 235/462.04
See application file for complete search history.

(56) References Cited

U.S. PATENT DOCUMENTS

| | | | |
|---|---|---|---|
| 7,394,084 B2 | 7/2008 | Kuriyama et al. | |
| 7,568,628 B2 | 8/2009 | Wang et al. | |
| 7,871,003 B2 | 1/2011 | Miyazaki et al. | |
| 8,866,168 B2 | 10/2014 | Bailey et al. | |
| 8,978,985 B2 | 3/2015 | Wang et al. | |
| 2006/0022214 A1* | 2/2006 | Morgan | F21K 9/00 257/99 |
| 2006/0237636 A1* | 10/2006 | Lyons | F21K 9/00 250/228 |
| 2007/0139638 A1* | 6/2007 | Wolpert | G01J 3/18 356/39 |
| 2012/0181338 A1* | 7/2012 | Gao | G06K 7/12 235/455 |

FOREIGN PATENT DOCUMENTS

JP 2007286793 A 11/2007
JP 5533714 B2 8/2012

OTHER PUBLICATIONS

International Search Report corresponding to International Application No. PCT/US2017/068282 dated, Dec. 22, 2017.

* cited by examiner

*Primary Examiner* — Toan C Ly
(74) *Attorney, Agent, or Firm* — Dentons US LLP

(57) ABSTRACT

One embodiment of a system and method for imaging objects from a barcode scanner may include generating a first color light source drive signal having a first duty cycle and a second color light source drive signal having a second duty cycle that is greater than the first duty cycle. In response to applying the first and second color light source drive signals to first and second color light sources, respectively, combining light beams generated by the first and second color light sources to produce a white illumination beam. An image sensor may generate image data of an object inclusive of a chine readable indicia captured in an image by the image sensor while illuminated by the white illumination beam. The machine readable indicia of the object in the image data may be read.

22 Claims, 8 Drawing Sheets

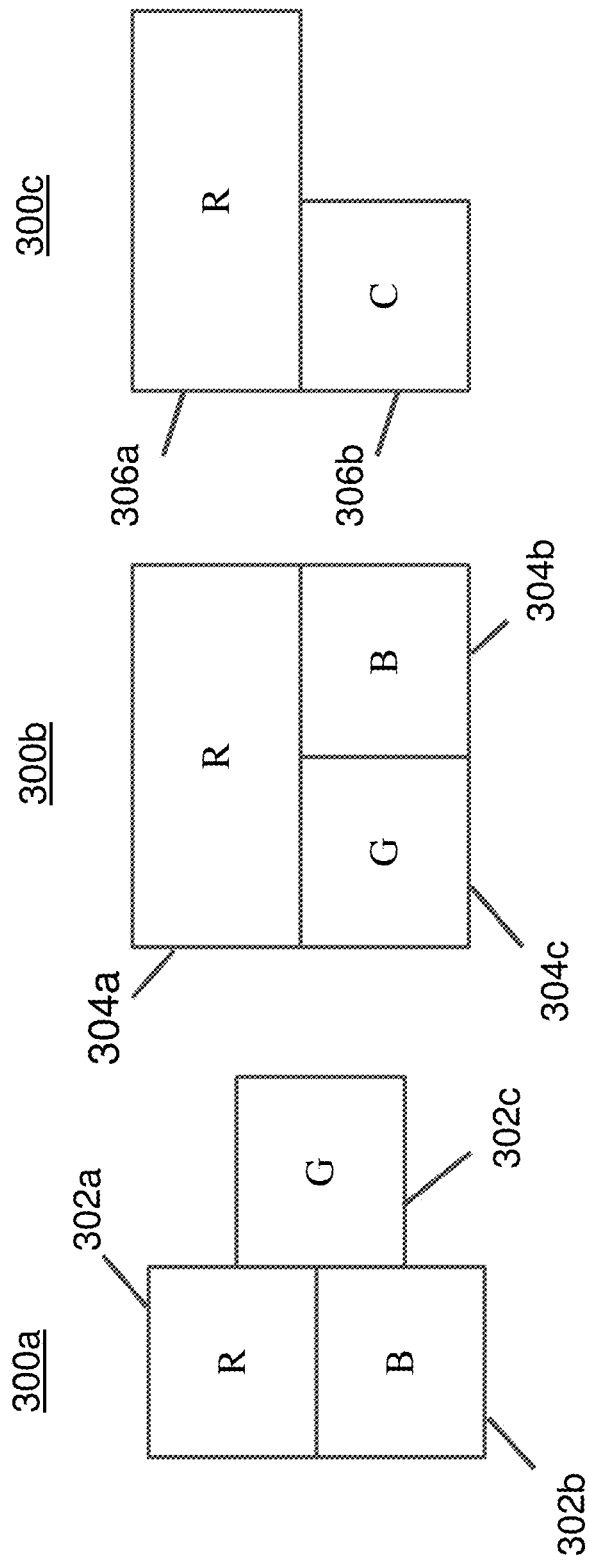

WHITE ILLUMINATION FOR BARCODE SCANNERS WITH IMPROVED POWER EFFICIENCY AND COST

BACKGROUND

Machine readable codes, such as barcodes, QR codes, visual features or patterns, and watermarks, such as the Digimarc® barcode, are essentially representation of information in a visual format. Such codes may include data characters and/or overhead characters represented by a particular sequence of bars and/or spaces that may have varying widths. Such codes have widespread applications. For example, machine readable codes can be used to identify a class of objects or unique items. As a result, these codes are found on a wide variety of objects, such as documents, retail goods, shipping boxes, product parts, company assets, and so on.

There are several types of data readers used for reading machine readable codes. The most common types of readers are laser based barcode scanners and imaging based barcode scanners. A laser based barcode scanner typically moves, i.e. scans, a laser light beam across the barcode. Imaging based barcode scanners typically include solid state image circuitry, such as charge coupled devices (CCD) or complementary metal-oxide semiconductor (CMOS) devices, and may be implemented using a one-dimensional or two-dimensional imaging array of photo sensors or pixels to capture an image of the optical code. One-dimensional CCD readers capture a linear cross section of the code, producing an analog waveform whose amplitude represents the relative darkness and lightness of the code. Two-dimensional CCD or CMOS readers may capture an entire two-dimensional image.

Although the code readers may rely on ambient light when capturing an image, several imaging readers may utilize an illumination source to illuminate the optical code in an attempt to improve the image data quality generated by the imaging device as well as to provide a certain signal response in the imaging device. Such a source of illumination can reduce exposure time and thereby improving imager performance, especially in low ambient light conditions and when imaging moving items. The use of active illumination for scanners is to provide good contrast on an image sensor for readable optical indicia that include barcode labels, digital watermark labels, and visual features or patterns, etc., on objects and/or package surfaces; while minimizing visibility and distraction of the illumination to users.

Most barcode scanners use single color illumination consisting of a red light emitting diode (LED) as an illumination source. The single color illumination limits the range of colors that can be used in the printed barcode and be detected with the scanner. A similar problem also occurs when using such scanner to read digital watermarks. Thus, although the conventional barcode scanners typically use red illumination, some newer barcode scanners are increasingly moving to white LEDs as illumination for scanners as opposed to the traditional red LED illumination. One of the reasons behind this change is that red illumination can be more stressful on the eyes when used for long periods. Another reason is that red is more distracting because it does not blend in with the natural ambient light in the room, and hence there is less color contrast between the ambient and scanner illumination.

There are multiple ways to generate white light. One way is by mixing tri-chromatic lights, for example, red light, green light, and blue light (RGB lights). However, since RBG LED chip power ratings are similar for typical RGB LEDs, those LEDs are relatively expensive, while a green LED in the tri-color LED package can be eliminated functionally for scanner active illumination. Moreover, the respective wavelengths of red and blue (R and B) colors are not ideal for scanner applications. Another way that white light LEDs are typically produced is by coupling an LED of one color with a phosphor coating of a different color to produce white light. As illustrated in FIG. 2, a light source that appears to be white is constructed from a blue LED 202, such as an LED made from an indium gallium nitride semiconductor transmitting blue light 204, that is covered with a layer of phosphor 206 that converts a portion of the blue light to a broad band of yellow light 208. When the ratio of blue 204 to yellow light 208 is chosen correctly, the resultant light source appears white. The overall efficiency of the phosphor-converted light source is determined by the efficiency with which the LED converts electricity to light and the efficiency with which the LED light is down-converted to white light in the portion of the spectrum to which the eye is sensitive. When blue light is converted to white light, the difference in energy of photons is lost in the form of heat and therefore PC-LED has lower energy efficiency at a high power consumption. Furthermore, there is a great deal of watermark signal loss on monochrome image sensors due to PC-LEDs having a wide spectrum, as understood in the art. Therefore, such a white phosphor-based LED requires an optical filter that may be placed adjacent to the LED in order to improve watermark reflectance signal strength, and thereby allowing the white phosphor-based LED to better read watermarks.

As understood, the above-described conventional white phosphor-based LEDs that are currently available have low energy efficiency and high cost of production due to the requirement of additional components, such as an optical filter in order to read watermarks, etc. Therefore, there is a need for an improved white light illumination device and method of producing white light illumination for a machine readable indicia scanner, such as a barcode scanner, used to read barcodes watermarks, and visual features or patterns.

SUMMARY

To overcome the shortcomings of conventional scanner systems having white phosphor-based LED for producing white light, multiple light emitting sources of different colors with different power ratings may be utilized in order to generate a white illumination beam. The subject matter described herein provides an optimized arrangement of a plurality of light emitting sources that may be placed adjacent to each other such that illumination of different colors from the light emitting sources at different wavelengths may be mixed to produce white light with improved power dissipation, and thereby replacing conventional white LEDs, such as phosphor-based LEDs, that are of low efficiency and high energy consumption. To produce the white light, different light source drive signals with same or different duty cycles may be applied to each of the light emitting sources.

In an embodiment, a scanner system for imaging an object inclusive of a machine readable indicia may include a first color light source configured to produce light at a first wavelength and a second color light source configured to produce light at a second wavelength. The barcode scanner system may further include controller electronics in electrical communication with the first color light source and the second color light source. The controller electronics may include a driver circuit configured to generate a first color light source drive signal having a first duty cycle that, when applied to the first color light source, causes the first color light source to produce a light beam at a first power level. The driver circuit may further be configured to generate a second color light source drive signal having a second duty cycle that, when applied to the second color light source, causes the second color light source to produce a beam of light at a second power level, where the second duty cycle is greater than the first duty cycle. When the first and second color light source drive signals are respectively applied to the first and second color light source respectively, the light beams combined from the first and second color light sources cause a white illumination beam to be generated. The controller electronics may further include an image sensor configured to capture an image and generate image data of an object illuminated by the white illumination beam. In an embodiment, the controller electronics may further include a processing unit configured to read one or more machine readable indicia of the object in the image data.

In an embodiment, a method for imaging objects by a scanner is provided. The method may include generating a first color light source drive signal having a first duty cycle. A second color light source drive signal may be generated having a second duty cycle, where the second duty cycle is greater than the first duty cycle. In response to applying the first and second color light source drive signals to the first and second color light source, respectively, light beams being combined from the first and second color light sources may generate a white illumination beam. Image data of an imaged object may be generated by an image sensor illuminated by the white illumination beam. One or more machine readable indicia associated with the object in the image data may be read.

In an embodiment, a barcode scanner system may include a first color light source configured to produce light at a first wavelength and a second color light source configured to produce light at a second wavelength. The barcode scanner system further includes controller electronics in electrical communication with the first color light source and the second color light source. The controller electronics may include a driver circuit configured to generate a first color light source drive signal having a first duty cycle that, when applied to the first color light source, causes the first color light source to produce a light beam at a first power level. The driver circuit may further be configured to generate a second color light source drive signal having the first duty cycle that, when applied to the second color light source, causes the second color light source to produce a beam of light at the first power level. When the first and second color light source drive signals are respectively applied to the first and second color light source, the light beams combined from the first and second color light sources cause a white illumination beam to be generated. In an embodiment, the controller electronics may further include an image sensor configured to capture an image and generate image data of an object illuminated by the white illumination beam. The controller electronics may further include a processing unit configured to read one or more machine readable indicia of the object in the image data.

In an embodiment, another process for imaging objects from a scanner is provided. The process may include generating a first color light source drive signal having a first duty cycle. A second color light source drive signal having the first duty cycle may be generated. The first and second color light source drive signals may be applied to first and second color light sources, and light beams generated by the first and second color light sources may be combined to generate a white illumination beam. Image data may be generated by an image sensor of an object illuminated by the white illumination beam. One or more machine readable indicia associated with the object may be read by a processing unit in the image data.

BRIEF DESCRIPTION OF THE DRAWINGS

Illustrative embodiments of the present invention are described in detail below with reference to the attached drawing figures, which are incorporated by reference herein and wherein:

FIG. 3A is an illustration of a configuration of multiple different color light sources in a barcode scanner system, according to an illustrative embodiment;

FIG. 3B is an illustration of an alternative configuration of multiple different color light sources in a barcode scanner system, according to an illustrative embodiment;

FIG. 3C is an illustration of another alternative configuration of multiple different color light sources in a barcode scanner system, according to an illustrative embodiment;

DETAILED DESCRIPTION OF THE DRAWINGS

Figure 1A:
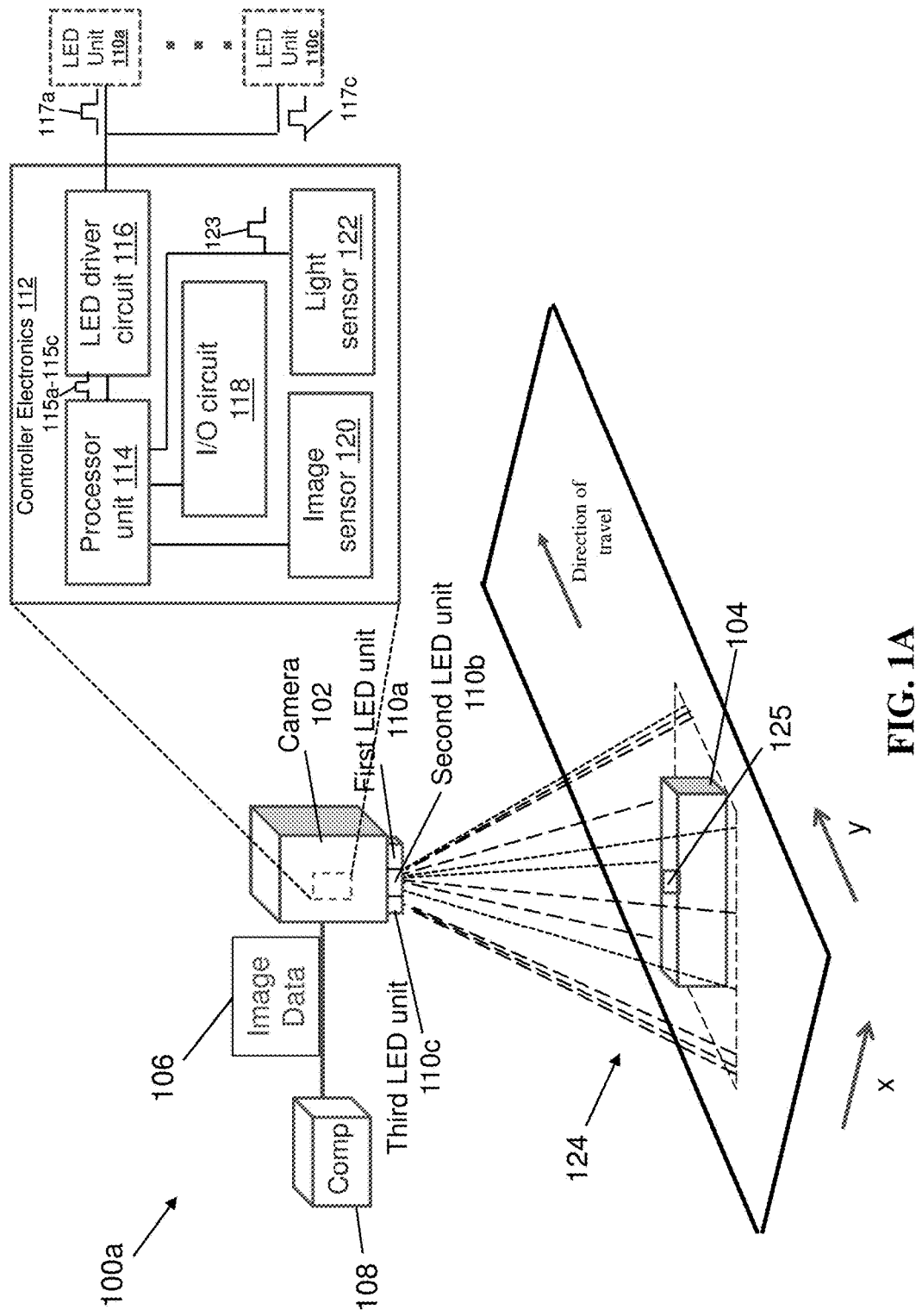
FIG. 1A is an illustration of an item processing system, according to an illustrative embodiment.

FIG. 1A is an illustration of an illustrative item processing system 100. The item processing system 100 may be a barcode scanning system or other image processing system, such as a product inspection system. The item processing system 100 may include a camera 102 configured to capture images of an object 104 and generate image data 106. In an embodiment, the image data 106 captured by the camera 102 may be communicated to a computer system 108 for processing thereby. Alternatively, the camera 102 may be configured to process the image data 106. Although the system 100 shows a single camera 102, multiple cameras may be utilized to capture images from similar or different angles. For the purposes of this document, a barcode scanner may include a scanner that is configured to scan machine readable indicia, including watermarks, as described herein.

The camera 102 may be coupled to or include multiple different color light sources. The color light sources may be light emitting diodes (LEDs), such as organic LEDs. In the illustrated embodiment, the plurality of color light sources may include a first LED unit 110a, a second LED unit 110b, and a third LED unit 110c (collectively 110). In some embodiments, the system 100 may include more than the three LED units 110 without diverging from the scope of the disclosed embodiments. Each of the LED units 110 may include one or more LEDs of the same or different colors configured to produce light at the same or different wavelengths. Alternatively, each of the LED units 110 may include one or more LEDs upon which color-specific control signals may be applied to produce a desired color from each of the respective LED units 110.

The system 100 may include controller electronics 112, which are in electrical communication with the LED units 110. The controller electronics 112 may include a processor unit 114, a LED driver circuit 116, an I/O circuit 118, an image sensor 120, and a light sensor 122.

The processor unit 114 may implement a processor/microprocessor system to control the operations of the controller electronics 112. The processor unit 114 may include a single processor or a plurality of processors for configuring the system 100 as a multi-processor system. The processor unit 114 may further include suitable logic, circuitry, and interfaces that are operable to execute one or more instructions based on sensor and other data received to perform operations of the system 100. The processor unit 114 may be realized through a number of processor technologies known in the art. The examples of the processor unit 114 may include, but are not limited to, an x86 processor, an ARM processor, a Reduced Instruction Set Computing (RISC) processor, an Application-Specific Integrated Circuit (ASIC) processor, an image processor, a digital signal processor, or a Complex Instruction Set Computing (CISC) processor. The support circuits for the processor unit 114 may include I/O circuits and interfaces 118, conventional cache, power supplies, clock circuits, data registers, or the like. The I/O circuit 118 may be coupled to the processor unit 114.

In some embodiments, the processor unit 114 may control the driving of LED units 110 that make up a light source of the system 100. The processor unit 116 may receive color-specific reference signals 115a-115c (collectively 115) from a color sensor (not shown), and generate color-specific control/drive signals in response to the color-specific reference signals. The color-specific control/drive signals may be generated to produce a desired color from the LED units 110.

The processor unit 114 may transmit the color specific reference signals 115 to the LED driver circuit 116. The LED driver circuit 116 may translate the color-specific reference signals 115 received from the processor unit 114 into color-specific drive signals that drive the LED units 110. For instance, the LED driver circuit 116 may produce color-specific drive signals 117a-117c (collectively 117) that control the LED units 110 on a per color basis. That is, the LED driver circuit 116 can control each color LED units 110 separately or sub-portions of any of the LED units 110. The color-specific drive signals 117 generated by the LED driver circuit 116 may involve voltage and/or current changes being applied to the LED units 110. Alternatively and/or additionally, time modulation and duty cycle can be used to control the intensity of the light that is emitted from the LED units 110 based on signals obtained from the light sensor 122.

In response to receiving the color-specific reference signals 115 from the processor unit 114, for instance a first color reference signal 115a may be applied to the LED driver circuit 116 to cause a first color LED drive signal 117a having a first duty cycle to be generated and applied to the first LED unit 110a. The first color LED drive signal 117a, when applied to the first LED unit 110a, causes the first LED unit 110a to produce a light beam of a first color and at a first power level. In some embodiments, the first LED unit 110a may include one or more red color LEDs. In some embodiments, the first LED unit 110a may include one or more blue color LEDs. In some embodiments, the first LED unit 110a may include a combination of red color LEDs and blue color LEDs.

In response to receiving a second color reference signal 115b from the processor unit 114, the LED driver circuit 116 may further generate a second color LED drive signal 117b having a second duty cycle for the second LED 110b, where the second duty cycle is greater than the first duty cycle. The second color LED drive signal 117b, when applied to the second LED unit 110a, may cause the second LED unit 110b to produce a light beam of a second color at a second power level that is lower than the first power level. In some embodiments, the second LED unit 110b may include one or more green color LEDs. In some embodiments, the second LED unit 110b may include one or more cyan color LEDs. In some embodiments, the second LED unit 110b may include one or more blue color LEDs. In some embodiments, the first LED unit 110a may include a combination of the green color LEDs, the cyan color LEDs, and the blue color LEDs. In operation, when the LED driver circuit 116 applies the first and second color light source drive signals 117a, 117b respectively to the first and second LEDs 110a, 110b, the light beams combined from the first and second LEDs 110a, 110b cause a white illumination beam 124 to be generated. First and second color LEDs may also be pulse or pulsing driven with high peak power simultaneously and synchronized with camera exposure time.

In some embodiments, the LED driver circuit 116 may generate a third color LED drive signal 117c having the first duty cycle for the third LED units 110c on receiving a third color reference signal 115c from the processor unit 114. The third color LED drive signal 117c, when applied to the third LED unit 110c, may cause the third LED unit 110c to produce a light beam of a third color at the first power level. In some embodiments, the third LED unit 110c may include one or more red color LEDs. In some embodiments, the third LED unit 110c may include one or more blue color LEDs. In some embodiments, the third LED unit 110c may include a combination of the red color LEDs and the blue color LEDs. In some embodiments, the third LED unit 110c and the first LED unit 110c may include different color LEDs selected from a group consisting of red color LEDs and blue color LEDs. In operation, when the first, the second, and the third color LED drive signals 117 are respectively applied to the first, the second, and the third LED units 110, the light beams combined from the first, the second, and the third LED units 110 cause a white illumination beam 124 to be generated. However, when the first and the third color LED drive signals 117a, 117c are respectively applied to the first and the third LEDs 110a, 110c respectively, the light beams combined from the first and the third LEDs 110a, 110c also cause a white illumination beam 124 to be generated. In an embodiment, third color LEDs may also be wide pulsing or DC driven with very low peak power. The third color LEDs may be asynchronized with camera exposure time and be utilized for visual purpose only, such as white, so that the third LEDs are very low power and low cost.

Intensity of the light beam(s) that are emitted from one or more LED units 110 used to generate the white illumination beam 124 may be altered by the LED driver circuit 118 based on an ambient level detected by the light sensor 122. The light sensor 122 may detect an ambient light level in a zone of operation, and send a signal 123 representative of the ambient light level to the processor unit 114. The processor unit 114, based on the received signal 123 representative of the ambient light level may be used to automatically adjust intensity of light being emitted from the one or more LED units 110 by causing the processor unit 114 and/or LED driver circuit 116 to alter duty cycle, for example, of color LED drive signals 117 to produce the visually white illumination 124. In an embodiment, the selection of LEDs in the one or more LED units 110 whose intensity may be adjusted may be determined by the processor unit 114 based on the ambient light level.

Alternatively, the processor unit 114 may transmit a signal (not shown) to the LED driver circuit 116 to automatically adjust intensity of light being emitted from the one or more LED units 110 to produce the white illumination beam 124 based on the ambient light level. The selection of LEDs in the one or more LED units 110 whose intensity may be adjusted may be determined by the processor unit 114 and/or the LED driver circuit 116 regarding which LEDs in the one or more LED units 110 intensity is to be adjusted and amount of intensity has to be adjusted. Again, the intensity of light being emitted from the one or more LED units 110 may be adjusted by altering duty cycle, for example, of the respective color LED drive signals 117 to produce the visually white illumination beam 124.

In some embodiments, the processor unit 114, in response to receiving a signal 123 representative of the ambient light level from the light sensor 122, may activate or deactivate the one or more LED units 110 or portions thereof used to produce light beams being combined to generate the white illumination beam 124. The selection of LEDs in the plurality of LED units 110 to be activated or de-activated may be determined by the processor unit 114 based on the ambient light level. A switch may be triggered by the processor unit 116 in order to activate or deactivate the one or more LED units 110 or portions thereof. Alternatively, the processor unit 116 may transmit a signal 123 to the LED driver circuit 118 to activate or deactivate the one or more LED units 110 or portions thereof.

The controller electronics 114 may further include the image sensor 120 configured to capture an image of the object 104 and to generate the image data 106 of the object 104 illuminated by the white illumination beam 124. The image data 106 may then be transmitted to the computing device 108 or the processing unit 116 for processing in order to read one or more machine readable indicia 125 of the object 104. The machine readable indicia 125 may include, for example, a barcode, QR code, watermark, features and patterns, or any other machine readable identifier. In addition, features of the object 104 may include, for example, label positioning, indicia positioning, edges, text, picture, graphic, or other features of the object 104. In an embodiment, the processor unit 104 may process or preprocess image data captured by the image sensor 120. In such a configuration, image data 106 is considered to be processed image data as opposed to raw image data.

Figure 1B:
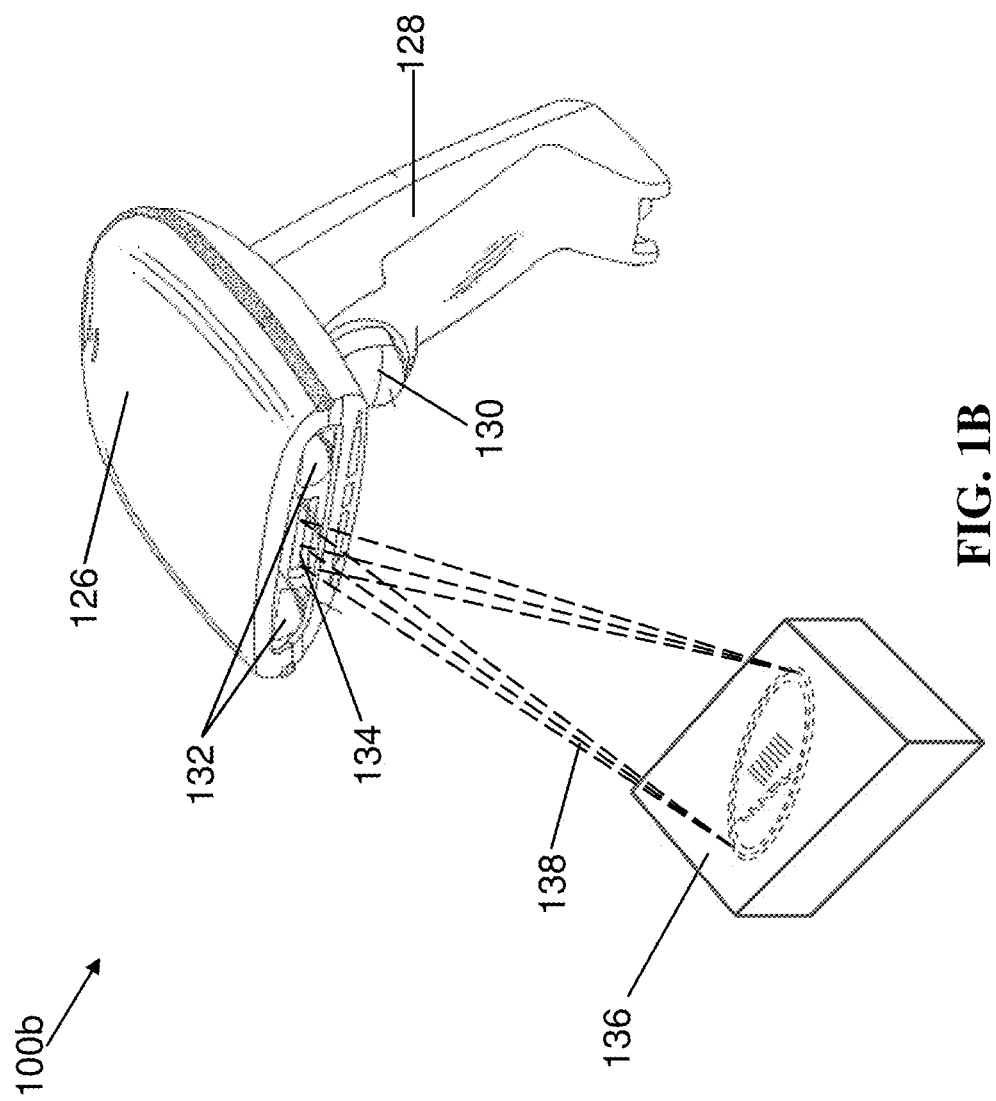
FIG. 1B is an illustration of a barcode scanner, according to an illustrative embodiment.
Figure 2:
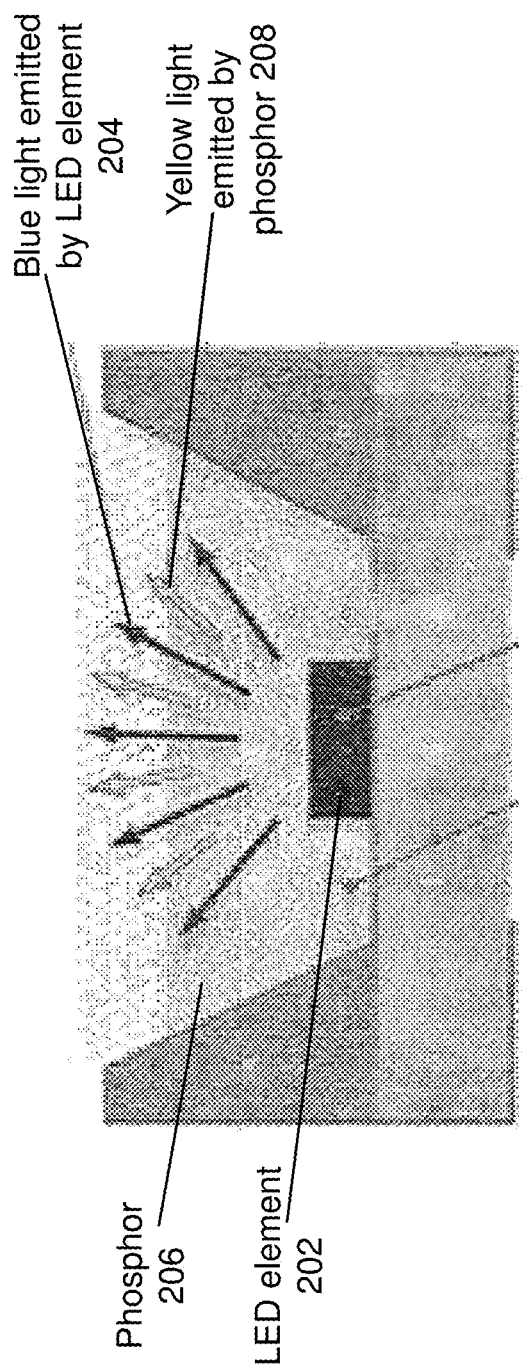
FIG. 2 is an illustration of a prior art device for producing white illumination by phosphor-based LED.

FIG. 1B is an illustration of a handheld barcode scanner 100b. The barcode scanner 100b may include a main body 126 and a handle 128. The handle 128 may include a scan trigger 130. The main body 126 has a camera 132 located therein, whereby the camera 132 may capture images through a lens (not shown). A light source 134 may be located near the digital camera 132. The barcode scanner 100b may also include a touch screen on its top surface that enables users to interact with the barcode scanner 100b disclosed herein in multiple ways. The screen itself may convey information to the user, such as current settings, current image scanned, a preview of the image to be captured, and previous images. Since the screen may be touch activated, a user may select icons, settings, or other items on the screen to interact with the digital barcode scanner 100b. Alternative user interfaces may be utilized, as well.

The camera 132 may be configured to capture images in the front of the barcode scanner 100b. Digital images may be produced by the camera 132. The lens of the camera 132 may be scratch resistant glass that both protects the internal camera 132 as well as resists scratches and other damage to its surface. The camera 132 may include a light source 134, which may be configured with three different color light emitting diodes (LED), that emits different color light upon an object 136 while an image of the object 136 is being captured by the camera 132. The three different color LEDs, or LED units, such as LED units 110 of FIG. 1A, may be integrated within the barcode scanner 100b. In some embodiments, a camera ready light may also be integrated into the front of the barcode scanner 100b. The camera ready light may emit a softer light so as to inform a user that an image is about to be captured. This camera ready or indicator light may use an amber colored LED light that emits light at a much lower intensity than the LED light source 134 that is used when an image is being captured.

During operation, when the user initiates the scanning process by triggering the scan trigger 130, a processor unit (not shown) of the barcode scanner 100b may be in electrical communication with the light source 134 to generate drive signals for each of the three different color LEDs. In an embodiment, the color LEDs may include one or more LEDs of red, blue, and green color. The processor unit may generate a first drive signal for the red and blue LEDs of the light source 134 having a first duty cycle, and a second drive signal for the green LED of the light source 134 having a second duty cycle, which is higher than the first duty cycle. The first drive signal may be applied to the red and blue LEDs of the light source 134 to cause the light source 134 to produce a beam of light from the red and blue LEDs having a first power value. The second drive signal may be applied to the green LED of the light source 134 to cause the light source 134 to produce a beam of light from the green LED having a second power value that is less than the first power value. In response to the first and second drive signals being applied to each of their respective LEDs of the light source 134, the light beams combined from each LED of the light source 134 may cause a white illumination beam 138 to be generated. First and second color LEDs may also be pulsing driven with high peak power simultaneously and synchronized with camera exposure time. Third color LEDs may also be wide pulsing or DC driven with very low peak power asynchronized with camera exposure time and optionally for visual purpose only, such as white; so that the third LEDs are very low power and low cost.

While the object 136 is being illuminated by the white illumination beam 138, the camera 132 may capture an image of the object 136. Thereafter, in an embodiment, the barcode scanner 100b may transmit captured image data to an external device, such as a processing unit through a wired or wireless data connection in order to read one or more machine readable indicia and identify features, such as watermarks on the object 136 in the image data. In some embodiments, the wired connection can include a serial or universal serial bus (USB) port, whereby the barcode scanner 100b may be connected to another device via a serial or USB cable. In an alternative embodiment, the barcode scanner 100b may use a wireless connection. For example, the barcode scanner 100b may include a wireless internet card that enables the scanner 100b to connect to a network over Wi-Fi® communications network, whereby data may be transferred between the barcode scanner 100b and an external device using transmission control protocol (TCP).

FIGS. 3A, 3B, and 3C are illustrations of illustrative of respective color light sources (collectively 300) of a barcode scanner system. With regard to FIG. 3A, a configuration of a first light source 300a of a barcode scanner system is shown. The first light source 300a may include one or more red color 302a, blue color 302b, and green color 302c LED units, respectively. In operation, in response to the application of drive signals from an LED drive circuit or a processing unit on the first light source 300a, the red and blue color LED units 302a, 302b may operate at a current of 1000 milliamps (mA) and a frequency of 80 Hertz (Hz), whereas the green color LED unit 302c may operate at a current of 2 mA in order produce beams of red, blue, and green colors which, when combined together, generate a white illumination beam. An image sensor of the barcode scanner system may capture an image of an object illuminated by the white illumination beam, and generate image data of the illuminated object. Image data may then be transmitted to a processing unit for processing in order to read one or more machine readable indicia, associated with the object as captured in the image data. It should be understood that the current and frequency values are illustrative, and other values may be utilized in imaging objects.

With regard to FIG. 3B, a configuration of a second light source 300b of a barcode scanner system is shown. The second light source 300b may include one or more red color 304a, a blue color 304b, and a green color 304c LED units, respectively. In operation, in response to the application of drive signals from an LED drive circuit or a processing unit on the second light source 300b, the red color LED unit 304a may operate at a current of 1000 mA and a frequency of 80 Hz, whereas the blue and green color LED units 304b, 304c may operate at a current of 2 mA in order produce beams of red, green, and blue colors which, when combined together, generate a white illumination beam. An image sensor of the barcode scanner system may capture an image of an object being illuminated by the white illumination beam, and generate image data of the illuminated object. The image data may then be transmitted to a processing unit for processing in order to read one or more machine readable indicia, associated with the object as captured in the image data.

With regard to FIG. 3C, a configuration of a third light source 300c of a barcode scanner system is shown. The third light source 300c may include one or more red color 306a and cyan color 306b LED units, respectively. In operation, in response to the application of drive signals from a LED drive circuit or a processing unit on the third light source 300c, the red color LED unit 306a may operate at a current of 1000 mA and a frequency of 80 Hz, whereas the cyan color LED unit 306b may operate at a current of 2 mA in order produce beams of red and cyan colors which, when combined together, generate a white illumination beam. An image sensor of the barcode scanner system may capture an image of an object being illuminated by the white illumination beam, and generate image data of the illuminated object. The image data may then be transmitted to a processing unit for processing in order to read one or more machine readable indicia, associated with the object as captured in the image data. For FIGS. 3A-3C, the LEDs may be combined at printed circuit board level or at an LED packaging level for smaller size and easier color mixing since the LEDs are closer to each other.

Figure 4A:
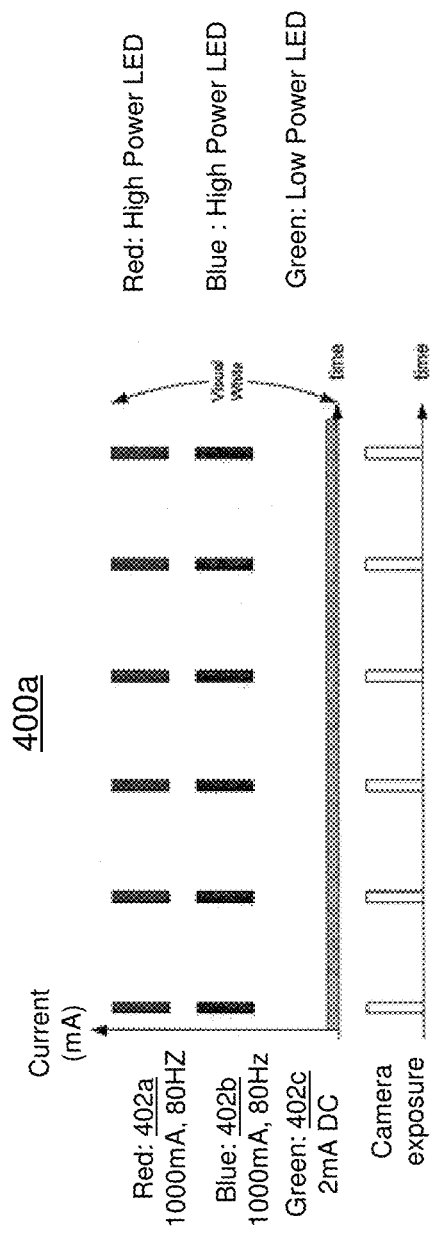
FIG. 4A is an illustration of waveforms of an LED current drive in a barcode scanner system, according to an illustrative embodiment.

FIG. 4A is an illustration of an illustrative graph 400a showing pulsing drive current waveforms of the LED units described in FIG. 3A is shown. Each of the three LED units may include one or more LEDs of a red color 402a, a blue color 402b, and a green color 402c, respectively. The red and blue color LED units 402a, 402b may be high power LEDs and driven to operate at a current of 1000 mA and a frequency of 80 Hz. In one example, the red color LED 402a may be 1Z2835AV66BFZIN2 by Brightek having a 660 nanometers (nm) wavelength and pulsing driven to operate at a peak current of 1000 mA and the blue color LED 402b may be STB0FS12A by Seoul Semiconductor Co., Ltd. having a 450 nm wavelength and pulsing driven to operate at a peak current of 1000 mA. The green color LED unit 402c may be a low power LED and be driven to operate at a DC current of 2 mA. In one example, the green color LED 402c may be QTLP650D4TR by Everlight or LG M670-J2L1-1-Z by Osram having a 570 nm wavelength and driven to operate at a current of 2 mA. The red, blue, and green color beams produced by the LED units 402a, 402b, 402c generate a visual white illumination beam when combined using the drive current shown in FIG. 4A.

Figure 4B:
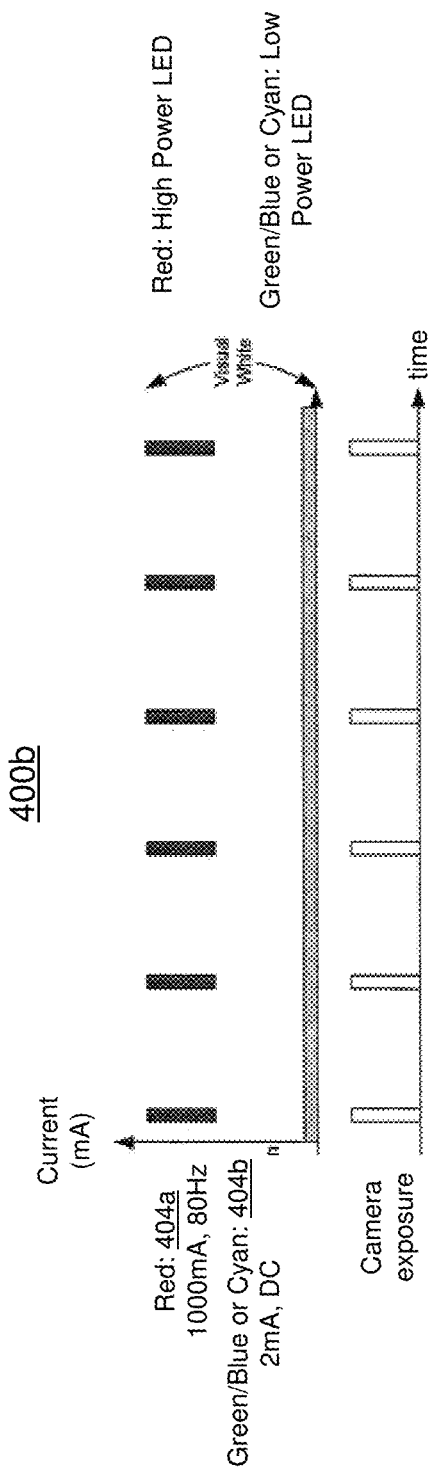
FIG. 4B is an illustration of waveforms of the LED current drive in a barcode scanner system, according to an illustrative embodiment.

FIG. 4B is an illustration of an illustrative graph 400b showing drive current waveforms of the LED units configuration described in FIGS. 3B and 3C is shown. The LED units may include LEDs of a red color 404a, and a LED unit of a green color, blue color, or a cyan color respectively 404b. The red color LED unit 404a may have high power LEDs, and operate at a pulsing peak current of 1000 mA and a frequency of 80 Hz. The green color, blue color, or cyan color LED unit 404b may have a low power LED and operate at a DC current of 2 mA. The red and green, blue, or cyan color beams produced by the LED units 404a, 404b generate a visual white illumination beam when combined using the drive current waveforms.

Figure 5:
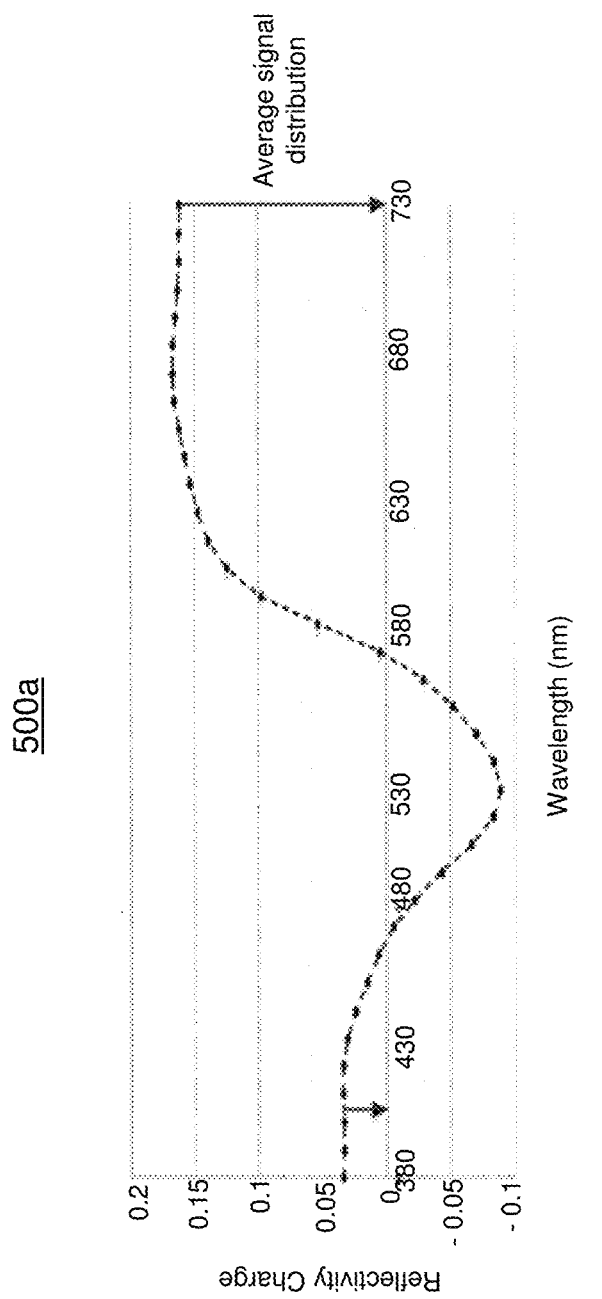
FIG. 5 is an illustration of a graph showing a typical watermark signal strength for a monochrome imager over wavelength distribution, such as a barcode scanner system, according to an illustrative embodiment.

FIG. 5 is an illustration of a graph 500a showing a typical watermark signal strength for a monochrome imager over wavelength distribution for a monochrome imager, such as a barcode scanner system. This graph 500a shows that the typical signal strength of a watermark extends over a wavelength range used to produce white light (i.e., monochrome imager) using only red and blue light to produce the useful signal on monochrome imager, as described herein. Moreover, the graph indicates that for one embodiment of printed labels, low contrast by far red (e.g., about 720 nm-730 nm peak wavelength) illumination, but deep blue (e.g., about 405 nm peak wavelength) illumination is sufficient to generate enough contrast to be readable by an image sensor for barcode labels, features or patterns, and watermarks, such as GS1 DW code, at the same time as visually the colors are at the end of the human visual curve. The use of deep blue has the human perception of being dark and less disturbing. In being about 720 nm-730 nm and about 405 nm, the value may be above or below the values by a percentage that still enables reading of the machine indicia (e.g., barcode, watermark, etc.). The graph further shows that for blue labels, deep blue illumination has low contrast, but far red illumination generates enough contrast for an image sensor to sense and read the watermark. It should be understood that the inclusion of green, as previously described, may further cause a reflectivity charge at a different wavelength. The use of green may be controlled outside of an imager exposure, which means that the imager does not image or see the green color while users are able to see the color. However, the graph 500a shows that the use a monochrome illumination source inclusive of two colors (i.e., red and blue) at certain power levels by applying certain duty cycles, for example, enables sensing of a watermark. It should also be understood that colors that operate at different wavelengths and with different power levels produced by different duty cycles and produce a reflectivity charge that may be sensed by an image sensor may also be utilized.

Figure 6:
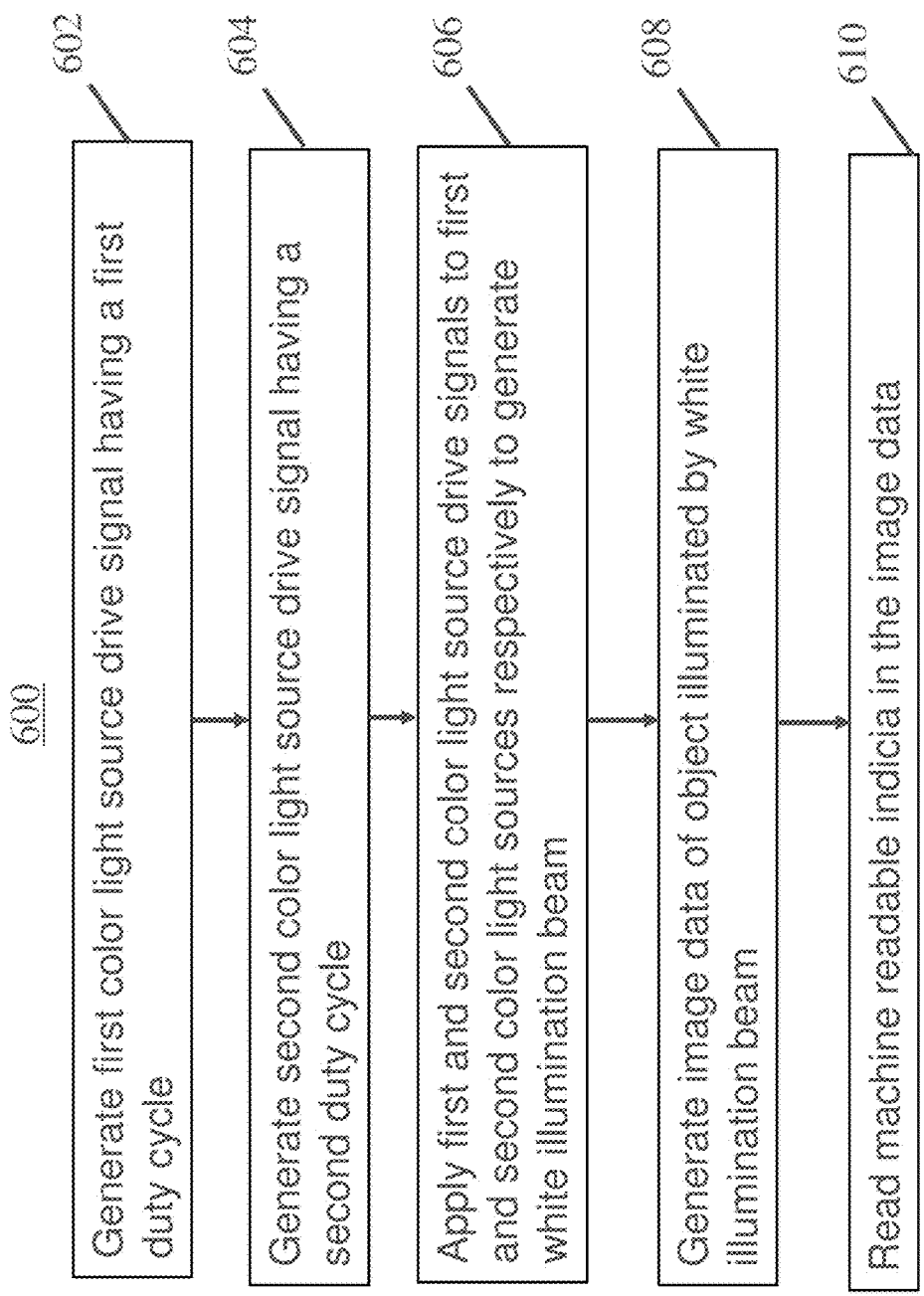
FIG. 6 is a flow diagram of an illustrative process for reading image data, according to an illustrative embodiment.

FIG. 6 is a flow diagram of an illustrative process 600 for reading image data. At step 602, a first color light source signal may be generated based on inputs having a first duty cycle. In some embodiments, the first color light source may include a red color LED. In some embodiments, the first color light source may include a blue color LED. In some embodiments, the first color light source may include a combination of red color and blue color LEDs.

At step 604, a second color light source signal may be generated by the processor unit and/or the LED driver circuit based on inputs received from the processor unit having a second duty cycle that is greater than the first duty cycle. In some embodiments, the second color light source may include a green color LED. In some embodiments, the second color light source may include a cyan color LED. In some embodiments, the second color light source may include a blue color LED.

At step 606, the first color light source drive signal may be applied to a first color light source to cause the first color light source to produce a light beam of a first color at a first power level. The second color light source drive signal may be applied to a second color light source to cause the second color light source to produce a light beam of a second color at a second power level that is lower than the first power level. The light beams combined from the first and second color light sources may cause a white illumination beam to be generated.

At step 608, a camera may capture an image of an object illuminated by the white illumination beam, and generate image data of the object. At step 610, the camera may transmit the image data to a processing unit through a wired or wireless data connection, where the processing unit processes the image data in order to read a machine readable indicia, watermark, and/or object features in the image data.

Figure 7:
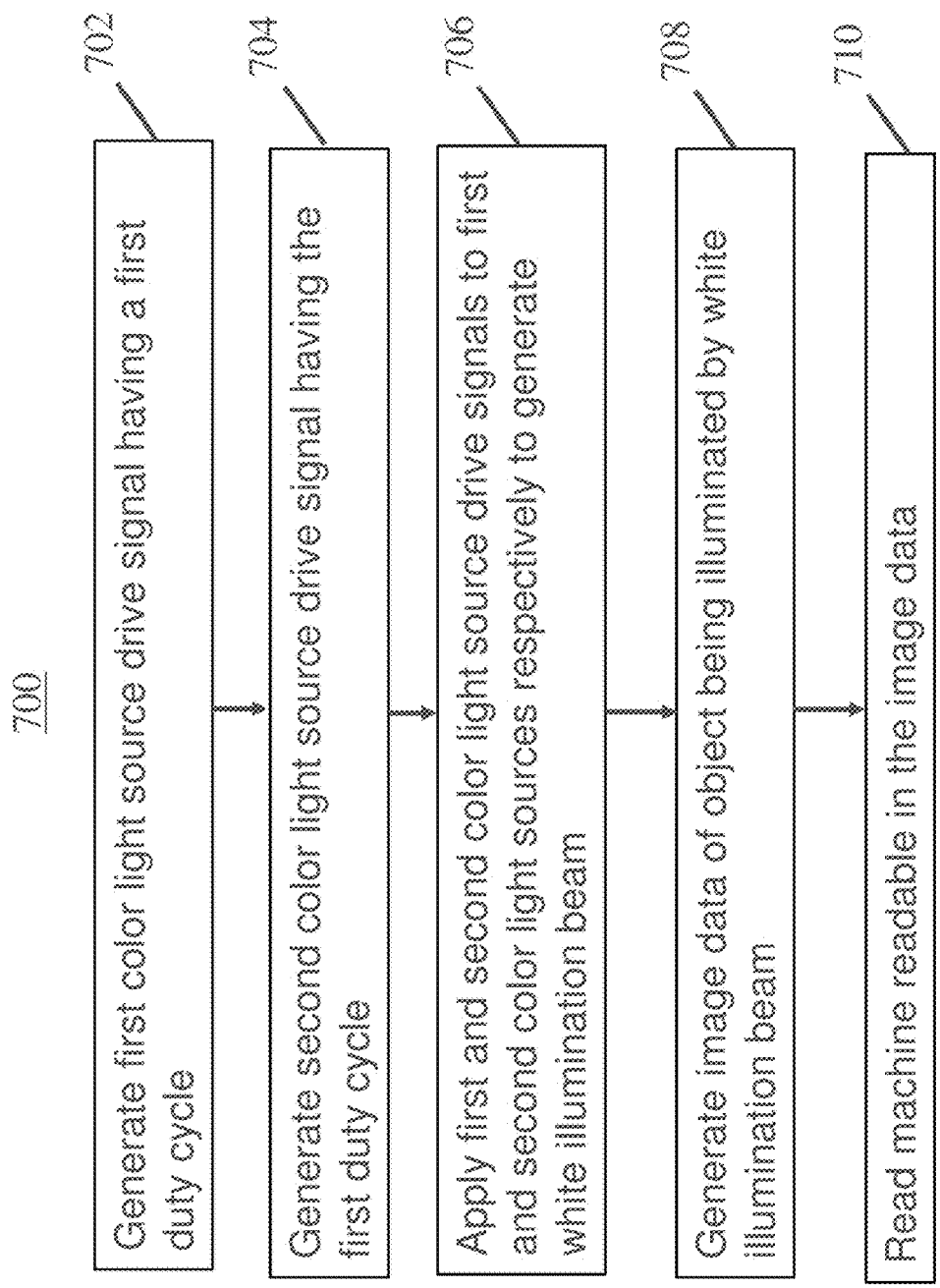
FIG. 7 is a flow diagram of an illustrative process for reading image data, according to an illustrative embodiment.

FIG. 7 is a flow diagram of an illustrative process 700 for reading image data. At step 702, a first color light source signal may be generated based on inputs having a first duty cycle. In some embodiments, the first color light source may include a red color LED. At step 704, a second color light source signal may be generated based on inputs having the first duty cycle. In some embodiments, the second color light source may include a blue color LED.

At step 706, the first color light source drive signal may be applied to a first color light source to cause the first color light source to produce a light beam of a first color at a first power level. The second color light source drive signal may be applied to a second color light source to cause the second color light source to produce a light beam of a second color at the first power level. The light beams combined from the first and second color light sources may cause a white illumination beam to be generated.

At step 708, a camera may capture an image of an object illuminated by the white illumination beam and generate an image data of the object. At step 710, the camera may transmit the image data to a processing unit through a wired or wireless data connection, where the processing unit may process the image data in order to read a machine readable indicia in the image data. The processing unit may be alternatively positioned within the scanner.

Although the configurations and processes described herein are being related to a barcode scanner, it should be understood that the principles may alternatively be utilized for non-barcode scanner applications. For example, other devices that produce white light that are used to illuminate objects with indicia disposed thereon may also utilize the principles described herein. It should also be understood that the principles may be utilized to produce non-white illumination, including infrared or other wavelengths, that may be more reflective or responsive to different wavelengths.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the principles of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The previous description is of a preferred embodiment for implementing the invention, and the scope of the invention should not necessarily be limited by this description. The scope of the present invention is instead defined by the following claims.

What is claimed:

1. A barcode scanner system, comprising:
   a first color light source configured to produce light at a first wavelength;
   a second color light source configured to produce light at a second wavelength;
   controller electronics in electrical communication with said first color light source and said second color light source, said controller electronics comprising:
      a driver circuit configured to generate:
         a first color light source drive signal having a first duty cycle that when applied to said first color light source causes said first color light source to produce a light beam at a first power level, and
         a second color light source drive signal having a second duty cycle that when applied to said second color light source causes said second color light source to produce a beam of light at a second power level such that the second duty cycle is greater than the first duty cycle, and when said first and second color light source drive signals are respectively applied to said first and second color light source respectively, the light beams combined from said first and second color light sources cause a white illumination beam to be generated;
   an image sensor configured to capture an image and generate image data of an object illuminated by the white illumination beam;
   a processing unit configured to read one or more machine readable indicia of the object in the image data; and
   a light sensor configured to detect an ambient light level, said controller electronics further being configured to receive a signal representative of the ambient light level from the light sensor, and automatically adjust intensity of light being emitted from the first and the second color light source to produce the visually white illumination based on the ambient light level.

2. The barcode scanner system according to claim 1, wherein the first color light source includes a red color light source and a blue color light source.

3. The barcode scanner system according to claim 1, wherein the second color light source includes a green color light source, a cyan color light source, and a blue color light source.

4. The barcode scanner system according to claim 1, wherein the first color light source is an LED and operates at a current at about 1000 milliamps (mA) and a frequency at about 80 Hertz (Hz).

5. The barcode scanner system according to claim 1, wherein the second color light source is an LED and operates at a current at about 2 mA.

6. The barcode scanner system according to claim 1, further comprises a switch configured to activate said first and second light sources based on the ambient light level.

7. A barcode scanner system comprising:
   a first color light source configured to produce light at a first wavelength;
   a second color light source configured to produce light at a second wavelength;
   controller electronics in electrical communication with said first color light source and said second color light source, said controller electronics comprising:
      a driver circuit configured to generate:
         a first color light source drive signal having a first duty cycle that when applied to said first color light source causes said first color light source to produce a light beam at a first power level, and
         a second color light source drive signal having the first duty cycle that when applied to said second color light source causes said second color light source to produce a beam of light at the first power level, and when said first and second color light source drive signals are respectively applied to said first and second color light source respectively, the light beams combined from said first and second color light sources cause a white illumination beam to be generated;
   an image sensor configured to capture an image and generate image data of an object illuminated by the white illumination beam;
   a processing unit configured to read one or more machine readable indicia of the object in the image data; and
   a light sensor to detect an ambient light level, said controller electronics further being configured to receive a signal representative of the ambient light level from the light sensor, and automatically adjust intensity of light being emitted from the first and the second color light source to produce the visually white illumination based on the ambient light level.

8. The barcode scanner system according to claim 7, wherein the first color light source is a red color light source.

9. The barcode scanner system according to claim 8, wherein the red color light source is an LED and has a peak wavelength at about 730 nm.

10. The barcode scanner system according to claim 7, wherein the second color light source is a blue color light source.

11. The barcode scanner system according to claim 10, wherein the blue color light source is an LED and has a peak wavelength at about 405 nm.

12. A method for imaging objects from a barcode scanner, the method comprising:
generating a first color light source drive signal having a first duty cycle;
generating a second color light source drive signal, having a second duty cycle such that the second duty cycle is greater than the first duty cycle;
in response to applying the first and second color light source drive signals to the first and second color light sources, respectively, combining light beams produced by the first and second color light sources to generate a white illumination beam;
generating image data of an object including a machine readable indicia illuminated by the white illumination beam;
reading the machine readable indicia associated with the object in the image data;
detecting an ambient light level by a light sensor; and
receiving a signal representative of the ambient light level from the light sensor, and automatically adjusting intensity of light being emitted from the first and second color light sources to produce the visually white illumination based on the ambient light level.

13. The method according to claim 12, wherein generating a first color light source includes generating a first color from a group consisting of red color and blue.

14. The method according to claim 12, wherein generating a second color light source includes generating a second color light source from a group consisting of green, cyan and blue.

15. The method according to claim 12, further comprising operating the first color light source at a current of about 1000 milliamps (mA) and a frequency of about 80 Hz.

16. The method according to claim 12, further comprising operating the second color light source at a current at about 2 milliamps (mA).

17. The method according to claim 12, further comprises activating said first and second color light sources from a switch based on the ambient light level.

18. A method for imaging objects from a barcode scanner, the method comprising:
generating a first color light source drive signal, having a first duty cycle;
generating a second color light source drive signal having the first duty cycle;
in response to applying the first and second color light source drive signals to the first and second color light sources, respectively, combining light beams generated by the first and second color light sources to generate a white illumination beam;
generating image data of an object including a machine readable indicia illuminated by the white illumination beam;
reading the machine readable indicia of the object in the image data;
detecting an ambient light level by a light sensor; and
receiving a signal representative of the ambient light level from the light sensor, and automatically adjusting intensity of light being emitted from the first and the second color light sources to produce the visually white illumination based on the ambient light level.

19. The method according to claim 18, wherein the first color light source is a red color light source.

20. The method according to claim 19, wherein the red color light source is an LED and has a peak wavelength of about 730 nanometers (nm).

21. The method according to claim 18, wherein the second color light source is a blue color light source.

22. The method according to claim 21, wherein the blue color light source is a LED and has a peak wavelength of 405 nanometers (nm).

* * * * *